US005182159A

United States Patent [19]

Yamauchi et al.

[11] Patent Number: 5,182,159

[45] Date of Patent: Jan. 26, 1993

[54] ELECTROSTATIC RECORDING MATERIAL

[75] Inventors: Hiroshige Yamauchi; Takashi Ogasawara; Tomotsugu Takahashi, all of Tokyo, Japan

[73] Assignee: Oji Paper Co., Ltd., Shinjuku, Japan

[21] Appl. No.: 645,440

[22] Filed: Jan. 24, 1991

[30] Foreign Application Priority Data

Jan. 25, 1990 [JP] Japan .................................... 2-13707

[51] Int. Cl.[5] .................................................. B32B 9/00

[52] U.S. Cl. .................................... 428/192; 428/195; 428/204; 428/206; 428/323; 428/913; 428/408

[58] Field of Search ............... 428/192, 195, 204, 206, 428/323, 913, 408; 423/445

[56] References Cited

U.S. PATENT DOCUMENTS 4,216,055 8/1980 Watanabe et al. .................. 427/121
4,248,952 2/1981 Paulin et al. .......................... 430/62
4,374,895 2/1983 Yasuda et al. ...................... 428/328
4,795,676 1/1989 Maekawa et al. .................. 428/328

FOREIGN PATENT DOCUMENTS 62-144172 6/1987 Japan .
1-6957 1/1989 Japan .
2080566 2/1982 United Kingdom .

OTHER PUBLICATIONS

Patent Abstracts of Japan, vol. 13, No. 172, Apr. 24, 1989.
Patent Abstracts of Japan, vol. 12, No. 456, Nov. 30, 1988.

*Primary Examiner*—Patrick J. Ryan
*Assistant Examiner*—W. Krynski
*Attorney, Agent, or Firm*—Armstrong, Westerman, Hattori, McLeland & Naughton

[57] ABSTRACT

An electrostatic recording material, capable of recording clear resist marks and colored images without generating a lead edge fog and colored image slippage, comprises an insulating support 1, an electroconductive intermediate layer 2 formed on a surface of the support, a dielectric layer 3 formed on the electroconductive intermediate layer, and a pair of electroconductive side edge layers 4, 5 formed on a record-starting side edge portion of the dielectric layer, in which side a recording operation in a transversal direction of the recording material is started, and on a record-ending side edge portion of the dielectric layer, in which side the recording operation is ended, extending along the longitudinal axis of the recording material, spaced from each other, and each having a surface resistivity of from $1\times10^4$ to $5\times10^5$ Ω; the electroconductive record-starting side edge layer having a surface resistivity ratio of 2:1 to 10:1 to the electroconductive record-ending side edge layer.

9 Claims, 1 Drawing Sheet

ELECTROSTATIC RECORDING MATERIAL

BACKGROUND OF THE INVENTION (1) Field of the Invention

The present invention relates to an electrostatic recording material. More particularly, the present invention relates to an electrostatic recording material able to be used for an electrostatic plotter for outputting colored images in a computer graphic (CG) system or computer aided design (CAD) system.

(2) Description of the Related Arts

A known electrostatic recording material has an electroconductive layer formed on at least one surface of a support and a dielectric layer formed on the electroconductive layer, and visible images are formed on the electrostatic recording material by applying required voltages from recording electrodes to the surface of the dielectric layer, to form latent images thereon. The latent images are developed with charged toners (consisting of colored fine solid particles or a developing liquid) and the developed colored images are fixed by heating, pressing or drying.

The toners include black, cyan, magenta and yellow-colored toners, and the latent images are converted to visible colored images by repeating the developing operation, with one of the above-mentioned colored toners, and the fixing operation.

Due to recent progress in computer graphics technology, a CAD technology in which various information images including design, external appearance, pattern, and animation images are formed by using a cathode ray tube, (CRT) and output by using a color electrostatic plotter, has been developed.

Also, due to recent progress in scanner technology, an image-outputting system in which images on a manuscript having a size of A3 or smaller are read at an image resolution of 16 dots/mm, by using the scanner, the read images are enlarged to a desired magnification of 12 times or less in each of longitudinal and transversal directions, by utilizing an image treatment technique, and the enlarged images are output by using a color electrostatic plotter, has been developed and is used for preparing posters or advertisements.

When the image-recording material is used outdoors, the recording material usually contains a high strength, water resistant support (substrate) made from a thermoplastic resin film, for example, a polyester or polycarbonate film, or a synthetic paper sheet produced by heat-kneading a mixture of a polyolefin resin, for example, polyethylene or polypropylene resin, with an inorganic pigment, for example, calcium carbonate or sintered clay, melt-extruding the resultant mixture through a film-forming die, drawing the resultant film, and laminating a plurality of the drawn films one upon the other.

The above-mentioned conventional support has a high electrical insulating property, and thus when used as a support of an electrostatic recording material, causes a creation of a lead edge fog (LEF) in preceding side portions of the recording area thereof.

It assumed that the creation of the lead edge fog occurs because, when latent images are formed on the dielectric layer of an electrostatic recording material by using an electrostatic plotter, the electric charge is transmitted through the electroconductive layer and flows into an earthed developing part of the electrostatic plotter.

As an attempt to solve the above-mentioned problem, Japanese Unexamined Patent Publication No. 53-125850 discloses a recording sheet in which at least one side edge portion of the electroconductive layer is exposed to the outside and can be grounded through an electroconductive endless belt arranged in the recording machine. Also, Japanese Unexamined Patent Publication No. 64-6956 discloses the arrangement of a pair of belt-shaped electroconductive layers in both side edge portions of the recording sheet, the belt-shaped electroconductive layers being grounded. The electric resistivity of the belt-shaped electroconductive layers has a close relationship to the intensity of the LEF and should be from $1 \times 10^4$ to $5 \times 10^5$ Ω/cm.

In the colored image recording system, since resistmarks for setting force recording positions are recorded at locations adjacent to the belt-shaped electroconductive layers, a reduction in image density of the resistmarks or defective images of the resistmarks occurs, and thus it becomes impossible to complete the recording operation.

SUMMARY OF THE INVENTION

An object of the present invention is to provide an electrostatic recording material capable of recording clear resist marks without generating a lead edge fog on a recording face thereof.

Another object of the present invention is to provide an electrostatic recording material capable of recording clear images having a high color image density, without generating a colored image slippage.

The above-mentioned objects can be attained by the electrostatic recording material of the present invention which comprises an electrical insulating support; an electroconductive intermediate layer formed on a surface of the support; a dielectric layer formed on the electroconductive intermediate layer; and a pair of electroconductive side edge layers formed on a record-starting side edge portion of the dielectric layer, in which side edge portion a recording operation in a transversal direction of the recording material is started, and on a record-ending side edge portion of the dielectric layer, in which record-ending side the recording operation is ended, extending along the longitudinal axis of the recording material spaced from each other, and each having a surface resistivity of from $1 \times 10^4$ to $5 \times 10^5$ Ω said electroconductive record-starting side edge layer having a surface resistivity ratio of 2:1 to 10:1 to the electroconductive record-ending side edge layer.

DESCRIPTION OF THE PREFERRED EMBODIMENTS

Figure 1:
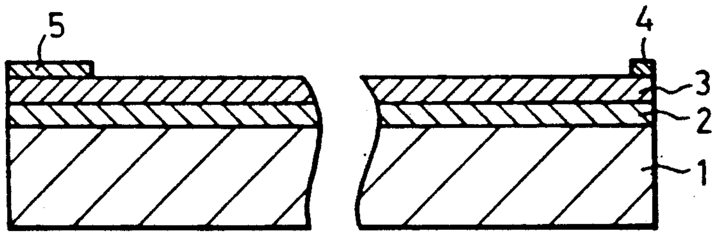
FIG. 1 is an explanatory cross-sectional view of an embodiment of the electrostatic recording material of the present invention.

In a known recent electrostatic recording system, a number of pin electrodes are divided into a plurality of groups, and each pin electrode in a group is connected to corresponding pin electrodes in the other groups. Therefore, when a negative pulse voltage is applied to a specific pin electrode in a specific group, all of the corresponding pin electrodes connected to the specific pin electrode exhibit the same voltage as that of the specific pin electrode. This voltage however, is not high enough to be discharged to a dielectric layer surface of a recording material.

When a positive pulse voltage is applied to a control electrode which is located adjacent to a pin electrode and on the same side as that of the pin electrode with respect to an electrostatic recording sheet, or on the opposite side to that of the pin electrode with respect to the electrostatic recording sheet and to the center of which control electrode a boundary between two of the pin electrode groups corresponds, a discharge occurs between the voltage-applied pin electrode and the corresponding voltage-applied control electrode, and an electrostatic latent image is formed on the electrostatic recording sheet.

Namely, by applying a pulse voltage successively to the individual pin electrodes in a group, and optionally, by applying a pulse voltage to the control electrode, a line (row) of latent images is formed on the electrostatic recording sheet in the transversed direction thereof.

The recording sheet is moved by a distance corresponding to the width of one line of the images in the longitudinal direction of the sheet, and then the same recording operation as that mentioned above is further carried out.

By repeating the above-mentioned operations, the aimed latent images are successively formed on the electrostatic recording sheet.

The direction in which a pulse voltage is successively applied to the individual pin electrodes in a group and the latent electrostatic images arranged in a transversal line are formed on an electrostatic recording material, is referred to as a recording direction.

In the electrostatic recording material of the present invention, with respect to the recording direction, a pair of electroconductive side edge layers are formed on a record-starting side edge portion of the dielectric layer, in which side a recording operation is started in a transversal direction (recording direction) of the recording material, and on a record-ending side edge portion of the dielectric layer, in which side the recording operation is ended, extends along the longitudinal axis of the recording material, and spaced from each other.

Also, the pair of electroconductive side edge layers have a surface resistivity of from $1 \times 10^4$ to $5 \times 10^5\ \Omega$.

Referring to FIG. 1, which shows an explanatory cross-sectional profile of an embodiment of the electrostatic recording material of the present invention, a surface of an electrically insulating support 1 is coated with an electroconductive intermediate layer 2, a dielectric layer 3 is formed on the electroconductive intermediate layer 2, and an electroconductive record-starting side edge layer 4 is formed on a recordstarting side edge portion of the dielectric layer 3, in which side a recording operation is started in a transversal direction of the recording material. Also, an electroconductive record ending side edge layer 5 is formed on a record-ending side edge portion of the dielectric layer 3, in which side the recording operation in the transversal direction of the recording material is ended.

In the electrostatic recording material of the present invention, the ratio in surface resistivity of the electroconductive record-stating side edge layer to the electroconductive record-ending side edge layer must be from 2:1 to 10:1. For example, when a recording operation is carried out from a right side to a left side of an electrostatic recording material, the surface resistivity of the electroconductive right side edge layer must be 2 to 10 times that of the electroconductive left side edge layer. This essential feature effectively prevents or reduces the occurrence of lead edge fog (LEF) and clarifies the resistmarks arranged adjacent to the electroconductive side edge layers and the recorded images.

In the electrostatic recording material of the present invention, the electrically insulating support is usually in the form of a sheet or film and comprises a member selected from electrical insulating thermoplastic resin films, for example, polyester films, polycarbonate films, polyethylene films, polypropylene films, polyvinyl chloride films, polyvinylidene chloride films and polystyrene films, and electrical insulating synthetic paper sheets, for example, multiple-layered synthetic paper sheets produced, for example, by heat-kneading a polyolefin resin, for example, polyethylene resin or polypropylene resin, optionally mixed with an inorganic pigment, for example, calcium carbonate or sintered clay, melt-extruding the mixture through a film-forming die, drawing the resultant undrawn film, and laminating two or more of the drawn films to form a laminated synthetic paper sheet.

Usually, the electrically insulating support has a volume resistivity of 10'' Ωcm or more and a thickness of 60 to 250 μm.

The electroconductive intermediate layer is formed on a surface of the insulating support.

The electroconductive intermediate layer comprises an electroconductive material comprising at least one member selected from polymeric electrolytes, semiconducting metal oxides and electroconductive inorganic salts, and a resinous binder.

The polymeric electrolytes usable for the present invention comprises at least one member selected from cationic poly electrolytes, for example, polyvinylbenzyl-trimethyl ammonium chloride, poly-dimethyldiallyl-ammonium chloride, and poly (styrene-trimethylaminoethyl-acrylate ammonium chloride), and anionic poly electrolytes, for example, polystyrene-sulfonates, polyacrylic acid salts and polyvinylphosphonates.

The semiconducting metal oxides usable for the present invention can be selected from, for example, zinc oxide particles doped with aluminum, copper or tin, tin (IV) oxide particles doped with antimony and mica, titanium dioxide, and calcium carbonate particles coated with at least one member of the semiconducting metal oxides as mentioned above.

The electroconductive inorganic salts usable for the present invention can be selected from, for example, lithium chloride, potassium chloride, sodium chloride and calcium chloride.

The resinous binder usable for the electroconductive intermediate layer of the present invention comprises at least one member selected from watersoluble resinous substances, for example, polyvinyl alcohol, starch, methyl cellulose, carboxymethylcellulose, casein, and water-soluble acrylic resins, which are usually employed in the form of an aqueous solution thereof, and water-insoluble resinous substances, for example, polyacrylic resins, polyvinyl acetate, polyvinyl chloride, polyvinylidene chloride, SBR and MBR, which are usually employed in the state of an aqueous emulsion, a latex or a solvent solution.

The electroconductive layer optionally comprises a pigment in addition to the electroconductive material and the resinous binder.

The pigment comprises at least one member selected from inorganic white pigments, for example, calcium carbonate, clay, sintered clay, lithopone which consists of zinc sulfide and barium sulfate, titanium dioxide, zinc oxide and aluminum hydroxide particles, and organic pigments, for example, polystyrene resin, polyacrylic resin, urea-formaldehyde resin, epoxy resin, melamine-formaldehyde resin, silicone resin, polyethylene resin, polypropylene resin, benzoguanamine resin beads. The pigment particles or beads usable for the present invention preferably have a small size of 2 μm or less.

The electroconductive layer is formed on a surface of the support by coating a coating paste containing the above-mentioned substances by using a conventional coating method, for example, an air-knife coating method, meyer bar coating method, gravure roll coating method, reverse roll coating method or blade coating method, and drying the resultant coated paste layer. Preferably, the electroconductive intermediate layer has a dry weight of 1 to 15 $g/m^2$ and a surface resistivity of $10^6$ Ω or less.

After the coating operation is completed, the surface of the resultant electroconductive intermediate layer is optionally surface-smoothed by a super calender, machine calender or gloss calender, to enhance the surface smoothness thereof.

The electroconductive intermediate layer is covered with a dielectric layer.

The dielectric layer comprises an electrical insulating resin and pigment, and preferably, has a dry weight of 2 to 7 $g/m^2$ and a surface resistivity of $10^8$ Ω or more.

The electrically insulating resin usable for the present invention comprises at least one resin preferably having a volume resistivity of $10^{11}$ Ωcm or more, more preferably $10^{12}$ Ωcm or more, for example, polyvinyl acetate resins, polyvinyl chloride resins, vinyl chloride-vinyl acetate copolymer resins, polyacrylic ester resins, polyvinylbutylal resins, polyester resins, nitrocellulose resins, polystyrene resin and styrene-acrylic ester copolymer resins.

The pigment for the dielectric layer can be selected from the same inorganic and organic pigments as those used for the electroconductive intermediate layer, except that the pigment preferably has a relatively large particle size of from 1 to 10 μm.

The dielectric layer can be formed from a coating paste containing the above-mentioned substances, in the same manner as that applicable to the electroconductive intermediate layer.

In the electrostatic recording material of the present invention, a pair of electroconductive side edge layer in the form of two belts spaced from each other and extending along the longitudinal axis of the recording material are formed on a record-starting side edge portion and record-ending side edge portion of the dielectric layer.

The electroconductive side edge layers can be formed on the above-mentioned portions of the dielectric layer surface by coating thereon with a coating paste comprising an electroconductive substance, for example, carbon black and a solvent-soluble resinous binder.

The resinous binder comprises at least one resinous material having a high flexibility and adhesion to the dielectric layer and selected from, for example, polyacrylic ester resins, polyurethane resins and polyester resins.

The solvent for the coating paste comprises at least one member selected from, for example, toluene, ethyl acetate, butyl acetate, acetone, methylethylketone, methyl-isobutyl ketone and cyclohexane.

The coating paste is prepared from the above-mentioned electroconductive substance, resinous binders and solvents, and applied to the side edge portions of the dielectric layer surface and dried to form a pair of the electroconductive side edge layers having a dry weight of 0.5 to 10 $g/m^2$.

Preferably, the width of the electroconductive side edge layers is from 0.5 to 10 mm.

The surface resistivity of each of the electroconductive side edge layers can be adjusted to a predetermined value by controlling the electroconductivity of the coating paste, and the dry weight and width of each of the electroconductive side edge layers.

For example, to adjust the surface resistivity of the electroconductive record-starting side edge layer to a valne larger than that of the electroconductive record-ending side edge layer, preferably the dry weight or width of the electroconductive record-starting side edge layer is made smaller than that of the electroconductive record-starting side edge layer; or the concentration of the electroconductive substance in the electroconductive record-starting side edge layer is made smaller than that of the electroconductive record-ending side edge layer.

EXAMPLES

The present invention will be further explained by the following specific examples.

Example 1

An electrostatic recording sheet was produced in the following manner.

A coating paste for an electroconductive intermediate layer was prepared by mixing 70 parts by weight of tin (IV) oxide doped with antimony with 30 parts by weight of a polyacrylic resin solution (available under the trademark of Elcom P-3016, from Shokubai Kasei K.K. and having a solid concentration of 30% by weight) and applying the mixture to a surface of a synthetic paper sheet having a thickness of 110 μm and available under the trademark of Yupo FPG-110, from OJI Yuka Goseishi K.K., to thereby form an electroconductive intermediate layer having a dry weight of 1.5 $g/m^2$.

A coating paste for a dielectric layer was prepared from 175 parts by weight of a styrene-acrylic ester copolymer resin solution (available under the trademark of Lunapel 2420 from Arakawa Kagaku Kogyo K.K. and having a solid concentration of 40%), 30 parts by weight of calcium carbonate (available under the trademark of Lighton A from Bihoku Funka Kogyo and having an average particle size of 1.80 μm) and 195 parts by weight of toluene, and was applied to the electroconductive intermediate layer surface to form a dielectric layer having dry weight of 3.5 $g/m^2$.

An electroconductive paint (available under the trademark of ElDIC EC-253 from Dainihon Ink Kagaku Kogyo K.K. and having a solid content of 25% by weight) was printed in the form of stripes having a width of 5 mm and a dry weight of 2.5 $g/m^2$, and spaced 605 mm apart, by using a gravure printing roll.

The printed sheet was longitudinally slit in the electroconductive paint stripes to provide a plurality of electrostatic recording sheets provided with an electroconductive record-starting side edge layer having a width of 1 mm and an electroconductive record-ending side edge layer having a width of 3 mm.

When the resultant electrostatic recording sheet was placed in an electrostatic color recording plotter, available under the trademark of VERSATEC COLOR ELECTROSTATIC PLOTTER CE-3424 from Fuji Xerox Co. Ltd.) by which latent images were successively formed on the recording sheet, from the right side to left side of the recording sheet.

The surface resistivities of the electroconductive side edge layers, which was measured between two electrodes spaced 1 cm from each other in the longitudinal direction of the recording sheet, are shown in Table 1.

Also, the quality of the recorded resistmark, the density of the lead edge fog (LEF), the recorded image density, and the colored image slippages of the electrostatic recording sheet were determined by using the above electrostatic plotter, and the results are shown in Table 1.

Example 2

The same procedures as described in Example 1 were carried out except that the widths of the electroconductive record-starting (right) and record-ending (left) side edge layers were 0.5 mm and 4 mm, respectively.

The results are shown in Table 1.

Examples 3 and 4

In each of Examples 3 and 4, the same procedures as described in Example 1 were carried out, with the following exceptions.

A polyester film having a thickness of 75 μm was used as an electrical insulating support.

A surface of the polyester film was coated with a coating paste comprising 100 parts by weight of a cationic electroconducting agent available under the trademark of GOSEFIMER C-820, from Nihon Gosei Kagaku K.K., and having a solid content of 30% by weight) and 100 parts by weight of methyl alcohol, and the resultant coating paste layer was dried to form an electroconductive intermediate layer having a weight of 4.5 $g/m^2$.

The surface of the electroconductive intermediate layer was coated with a coating paste comprising 200 parts by weight of an polyacrylic resin (available under the trademark of DIANAL LR-214, from Mitsubishi Rayon Co. and having a solid content of 40% by weight) 20 parts by weight of calcium carbonate powder (available under the trademark of NS-100, from Nitto Funka Kogyo K.K., and having an average particle size of 2.1 μm) and 180 parts by weight of toluene, and the resultant coating paste layer was dried to form a dielectric layer having a weight of 3.5 $g/m^2$.

The electroconductive side edge layers were formed from an electroconducting paint containing carbon black, (available under the trademark of EC-252 from Dainihon Ink Kagaku Kogyo K.K. and having a solid content of 25% by weight), in the same manner as in Example 1, except that the widths of the electroconductive record-starting (right) and record-ending (left) side edge layers were 1 mm and 3 mm in Example 3 and 0.5 mm and 4 mm in Example 4, respectively.

The results are shown in Table 1.

Example 5

The same procedures as described in Example 1 were carried out, except that the electroconductive recordending (left) side edge layer was formed by repeating the same printing operation as in Example 1 twice, and had a dry weight of 4.8 $g/m^2$, whereas the electroconductive record-starting (right) side edge layer was formed by a single printing operation and had a dry weight of 2.5 $g/m^2$, and both the electroconductive record-starting (right) and record-ending (left) side edge layers had a width of 2 mm.

The results are indicated in Table 1.

Comparative Example 1 to 3

In each of Comparative Examples 1 to 3, the same procedures as described in Example 1 were carried out, except that the electroconductive record-starting (right) and record-ending (left) side edge layers had the widths as shown below.

| | Item Width (mm) | |
|---|---|---|
| Comparative Example No. | Record-starting (right) side edge layer | Record-ending (left) side edge layer |
| 1 | 4 | 4 |
| 2 | 0.3 | 0.2 |
| 3 | 4 | 0.3 |

The results are shown in Table 1.

TABLE 1

| Example No. | | Item Surface resistivity (Ω) of electroconductive side edge layers: Record-starting (right) side | Record-ending (left) side | Surface resistivity ratio | Quality of recorded resistmark | Density of lead edge fog (LEF) | Recorded image density (black) | Colored image slippage |
|---|---|---|---|---|---|---|---|---|
| Example | 1 | $7.5 \times 10^4$ | $2.0 \times 10^4$ | 3.75 | Good | 0.02 | 1.22 | No |
| | 2 | $1.0 \times 10^5$ | $1.5 \times 10^4$ | 6.67 | Good | 0.02 | 1.20 | No |
| | 3 | $9.0 \times 10^4$ | $3.5 \times 10^4$ | 2.57 | Good | 0.02 | 1.25 | No |
| | 4 | $2.0 \times 10^5$ | $2.5 \times 10^4$ | 8.00 | Good | 0.02 | 1.23 | No |
| | 5 | $4.5 \times 10^4$ | $2.0 \times 10^4$ | 2.25 | Good | 0.02 | 1.28 | No |
| Comparative Example | 1 | $1.5 \times 10^4$ | $1.5 \times 10^4$ | 1.00 | Bad | 0.01 | 1.10 | Found |
| | 2 | $4.0 \times 10^5$ | $7.0 \times 10^5$ | 0.57 | Good | 0.12 | 1.26 | No |
| | 3 | $1.5 \times 10^4$ | $4.0 \times 10^5$ | 0.04 | Bad | 0.02 | 1.25 | Found |

We claim:

1. An electrostatic recording material comprising:
an electrical insulating support;
an electroconductive intermediate layer formed on a surface of the support;
a dielectric layer formed on the electroconductive intermediate layer; and
a pair of electroconductive side edge layers formed on a record-starting side edge portion of the dielectric layer, in which record-starting side a recording operation in a transversal direction of the recording material is started, and on a record-ending side edge portion of the dielectric layer, in which record-ending side the recording operation is ended, extending along the longitudinal axis of the recording material, spaced from each other, and each having a surface resistivity of from $1 \times 10^4$ to $5 \times 10^5$ Ω, and each electroconductive side edge layer comprising carbon black and a resinous binder, having a weight of 0.5 to 10 $g/m^2$, and having a width of 0.5 to 10 mm, and said electroconductive record-starting side edge layer having a surface resistivity ratio of 2:1 to 10:1 to said electro-conductive record-ending side edge layer.

2. The electrostatic recording material as claimed in claim 1, wherein the electrical insulating support comprises at least one member selected from the group consisting of electrical insulating thermoplastic resin films, and electrical insulating synthetic paper sheets.

3. The electrostatic recording material as claimed in claim 1, wherein the electrical insulating support has a volume resistivity of $10^{11}$ Ωcm or more.

4. The electrostatic recording material as claimed in claim 1, wherein the electroconductive intermediate layer comprises an electroconductive material comprising at least one member selected from the group consisting of polymeric electrolytes, semiconducting metal oxides and electroconductive inorganic salts, and a resinous binder.

5. The electrostatic recording material as claimed in claim 4, wherein the electroconductive intermediate layer further comprises a pigment.

6. The electrostatic recording material as claimed in claim 1, wherein the electroconductive intermediate layer has a dry weight of 1 to 15 $g/m^2$

7. The electrostatic recording material as claimed in claim 1, wherein the dielectric layer has a volume resistivity of $10^{11}$ Ωcm or more.

8. The electrostatic recording material as claimed in claim 1, wherein the dielectric layer comprises a dielectric polymeric material having a volume resistivity of $10^{11}$ Ωcm or more, and a pigment.

9. The electrostatic recording material as claimed in claim 8, wherein the pigment in the dielectric layer has an average particle size of 1 to 10 μm.

* * * * *